INVENTOR
HARRY G. HARRIES
BY
Wheeler, Wheeler & Wheeler
ATTORNEYS

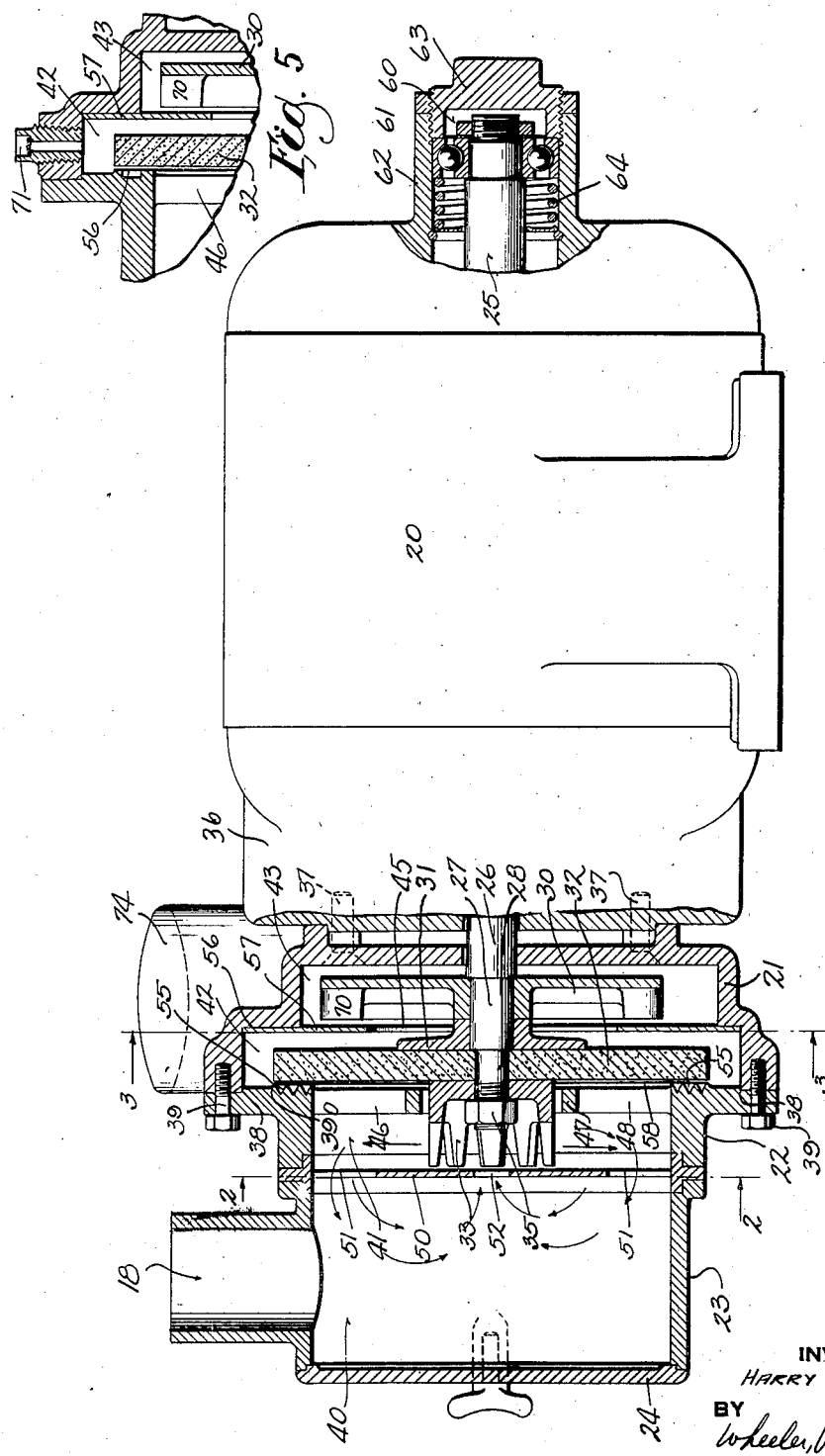

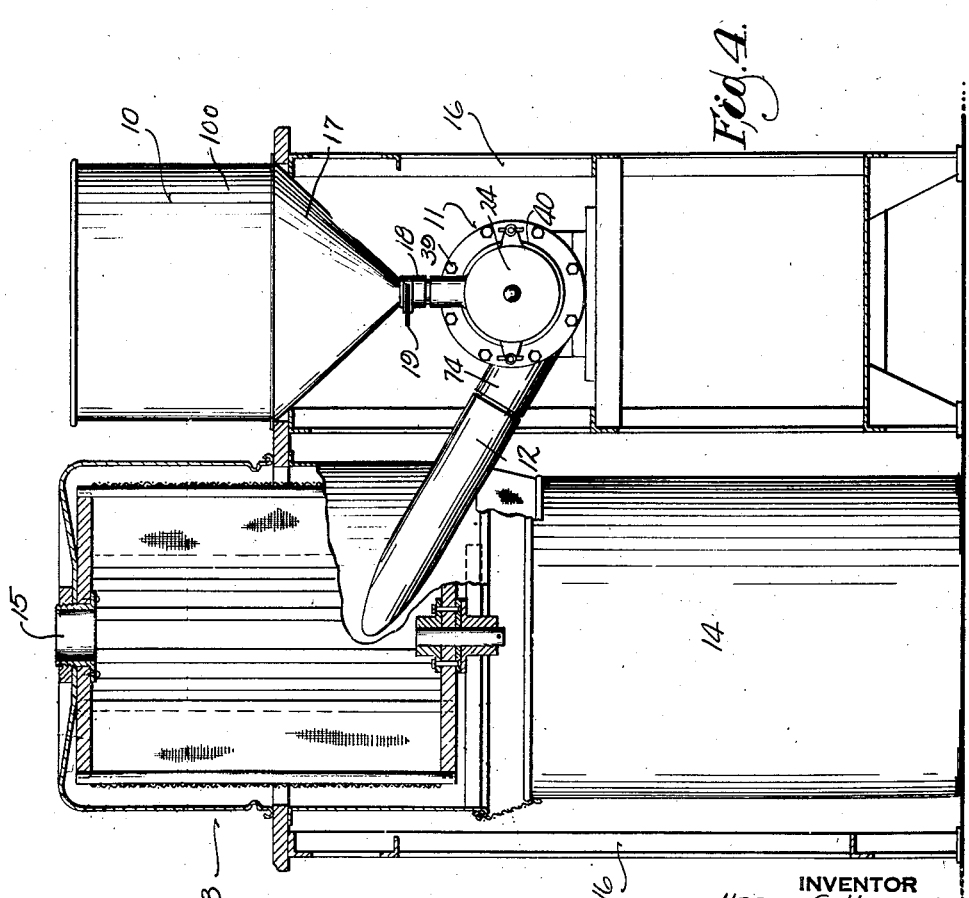

Patented Oct. 5, 1943

2,330,969

UNITED STATES PATENT OFFICE 2,330,969

GRINDING APPARATUS

Harry G. Harries, Milwaukee, Wis., assignor to Harries Hi-Vita Mill and Milling Co., Milwaukee, Wis., a corporation of Wisconsin Application May 20, 1940, Serial No. 336,147

5 Claims. (Cl. 83—8)

This invention relates generally to grinding apparatus and more specifically it relates to a mill which is adapted for grinding grain or the like and which may be constructed in portable or semi-portable form.

The invention has for its objects the provision of:

Improved means for drawing grain through a grinding mill having a vertically disposed grinding wheel whereby to prevent congestion in packing of the ground product adjacent the grinding wheel during operation of the device;

Improved means for evenly distributing grain to be ground and effecting delivery thereof into contact with side wall portions with a vertically disposed grinding wheel, together with means for the relief of pressure build-up between the grain and said wheel surface;

Improved means for delivering grain to the grinding element without relying upon the pull of gravity as an aid to this accomplishment;

Improved apparatus for delivering the ground product to a separator in such form as to be readily separated thereby.

A grinding mill which is inexpensive and comparatively simple to construct and operate, and which is especially efficient in the grinding of grain into a fine flour.

Other objects and advantages of the invention will become apparent to persons skilled in the art upon examination of the following description, drawings, and the appended claims.

In the drawings:

Fig. 1 is a view partially in elevation and partially in vertical cross section of the improved grinder and blower unit, and disclosing means for adjusting the grinding wheel.

Fig. 4 is an elevational view of a complete mill embodying my invention and showing the environment in which my grain grinding device is incorporated.

Figure 3:
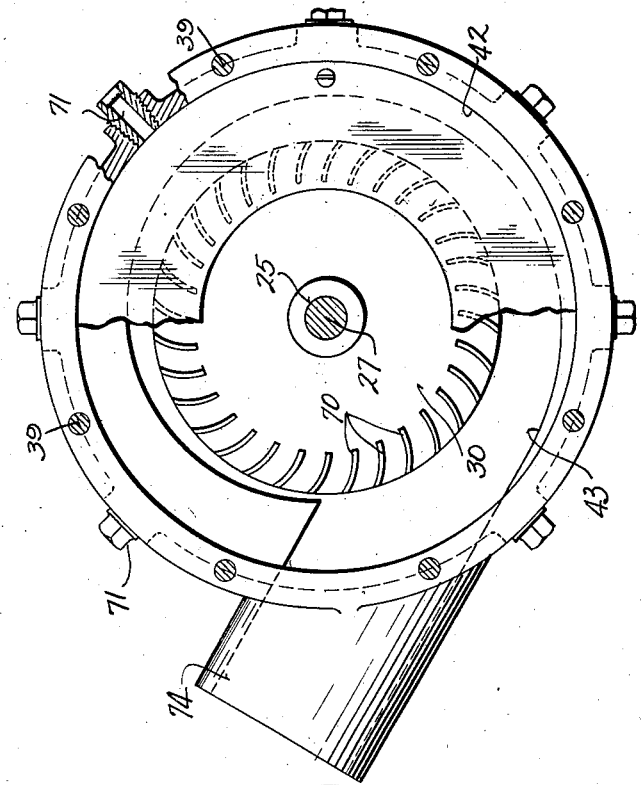
Fig. 3 is a section taken along line 3—3 of Fig. 1 and showing the blower feed plate partially broken away to better disclose the blower construction.

Fig. 5 discloses an alternate embodiment of the invention as incorporated in the grinder blower unit.

Like parts are identified by the same reference characters throughout the several views.

A preferred form of the invention, as disclosed in Fig. 4 includes a hopper 10 which contains the material such as kernels of wheat or the like which is fed to the grinding and blower unit 11, from whence it is pneumatically conveyed through a duct 12 into a separator 13 to be separated from air or other fluid employed to effect said pneumatic conveyance. Upon being separated from the pneumatic conveyor stream, the finished product falls into container 14, the free air finding its escape through opening 15 in the top of the separator. Suitable supporting means 16 are shown to position the units, but they form no part of the invention.

Hopper 10 preferably includes a cylindrical casing 100 which leads into a frustro-conical casing 17. The apex of casing 100 leads into a spout 18, which is provided with a slidably adjustable gate 19 to permit control of the flow of material from hopper 10 to an intake chamber 40 of a grinder blower unit 11, as hereinafter described.

As best shown in Fig. 1, the grinder blower unit 11 includes an electric motor 20, a blower housing 21, a grinding chamber housing 22, and an intake chamber housing 23, the outer end of which is closed by a removable plate 24. Motor 20 has an armature shaft 25, one portion of which projects through casing 21 and into casing 22, said shaft portion being provided with a bearing section 26, a reduced fan mounting section 27, and a further reduced and partially threaded grinder wheel and agitator mounting section 28. A turbine type blower fan 30 is mounted on section 27 in abutting relation to the end of bearing portion 26. A separator collar 31 is also mounted upon portion 27 with one end in abutting relation to fan 30 and the other end disposed in flush relation to an annular collar between shaft portions 27 and 28 and also in abutting relation to one side of a grinder wheel 32 which is mounted to rotate in a vertical plane on shaft portion 28. A cup-shaped agitator 33, provided with serrated side walls, is mounted adjacent wheel 32 on portion 28. All of the mounted elements set forth are clamped together against the shoulders of shaft 25 to rotate therewith. A nut 35 which is in threaded engagement with section 28 holds the assembled parts in clamped relationship.

Figure 2:
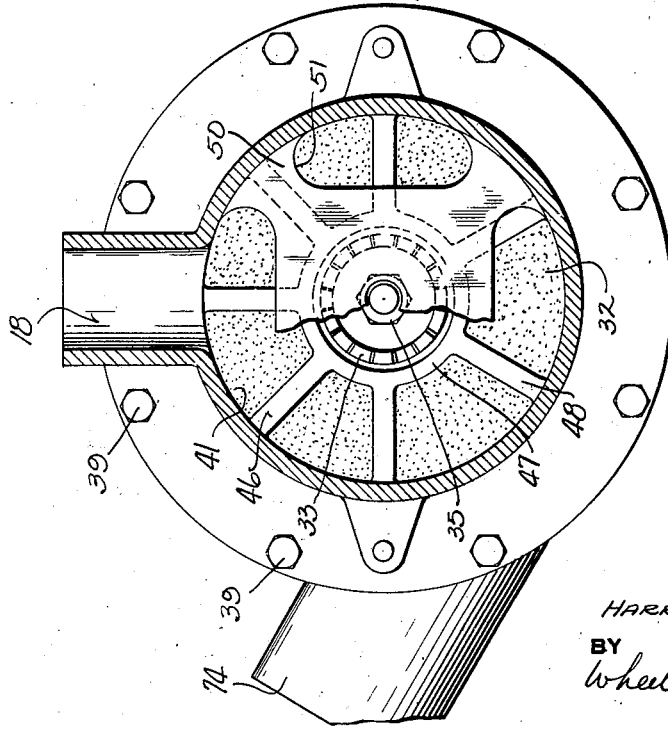
Fig. 2 is a section taken along line 2—2 of Fig. 1 and showing the feed regulating plate partially cut away.

A housing end portion 36 of motor 20 and a portion of blower housing 21 have complementary portions adapted to be clampingly engaged by studs 37. Housing 22 is provided with an annular shoulder 38 which is clampingly engaged by studs 39 to complementary portions of housing 21. Housings 22 and 23 are separated into an intake chamber 40 and a grinder chamber 41 by a feed delivery plate 50 which is provided with circumferentially spaced apertures 51, preferably four in number, and a centrally disposed aperture 52 as disclosed in Fig. 2. A plate 57 is secured to an annular shoulder 56 of housing 21 to divide the housing into a grinder wheel chamber 42 and a blower fan chamber 43. Plate 57 is provided with a centrally disposed aperture or eye 45.

Housing 22 comprises a generally cylindrical body having an end 390 adjacent the grinding wheel, radially flanged as mentioned to provide a partial end closure for the grinder wheel chamber 42. An integral spider-like structure 46 comprising a hub portion 47 and radially disposed spokes 48 is positioned vertically within housing 22 adjacent the grinding wheel 32. The portion of the flanged wall of housing 21 directly adjacent the grinding wheel 32 is provided preferably with a multiple of annular grooves as indicated by reference numeral 55, but, if preferred, only one annular groove 56, Fig. 5, may be employed. Spokes 48 have an under-cut wall adjacent the grinding wheel 32 to provide elongated channels 58 therebetween in which grain is lodged or wedged during the grinding operation.

Adjustment of grinder wheel 32 with respect to spider 46 and also in respect to the annular ribbed portion 55 of wall 39 is provided through axial movement of the armature shaft 25 and wheel 32 by means of a ball-bearing adjustment element 60 provided at the opposite end of the shaft as shown in Fig. 1. A bearing 61 is fixed to the shaft terminus and is mounted for axial movement in respect to the motor housing in an extended portion 62 of the motor housing, as shown. A shaft adjusting plug 63 is in screw threaded relation to the housing portion 62 to maintain the bearing 61 against a helical spring 64, said spring being partially compressed to bias the bearing 61 against plug 63 whereby, upon threaded adjustment of the plug, to permit axial adjustment of the shaft in either direction.

In grinding apparatus having a vertically positioned wheel, there exists a problem of evenly distributing the material to be ground to the grinding surface of the wheel. There is a tendency for grain to concentrate about the lower portion of the grinding wheel and also for the grain to be packed about the inner wall of the grinding chamber wall in such a manner that it cannot be evenly fed to the grinding wheel. I have successfully solved these problems by provision of agitator 33, spider 46, and the feed plate 50, between which there exists a correlation hereinafter described.

During operation of the device, grain from hopper 10 enters intake chamber 40 through inlet pipe 18, where a supply builds up, a certain amount being constantly drawn into chamber 41 through the centrally disposed aperture 52. The agitator 33 which is adapted to rotate at a high speed acts as a suction pump to draw a steady stream of grain through aperture 52 and to agitate constantly the grain which is drawn into chamber 41 whereby to prevent packing of the grain within this chamber. The circumferentially spaced apertures 51 are not inlet apertures through which grain enters chamber 41, their function being to provide means for the relief of pressure build-up within said chamber 41 to insure proper distribution of the grain in respect to spider 46 and grinding wheel 32 and to relieve a grain concentration at the outer portions of the chamber due to the rotation of the agitator and grinder wheel. Grain delivery from chamber 40 through aperture 52 is assisted by a partial vacuum which is maintained within the center of the cup-shaped agitator 33 by reason of the high speed rotation thereof.

As heretofore mentioned, spokes 48 are undercut adjacent wheel 32 to provide elongated channels 58. These channels or recesses are of less depth than the average thickness of the kernels of grain, there being just enough clearance or entryway for the grain to become lodged between the spokes and the grinding wheel 32. While being so lodged, the kernels of grain are ground fine enough to pass between the spokes and the wheel and when the centrifugal force acts upon them they are thrown outwardly, the rotary movement of wheel 32 carrying them from one spoke to the next spoke until they are ultimately ground fine enough to pass between the ribbed surface 55 of wall 39 and the grinding wheel to enter chamber 42, this transfer being accomplished by centrifugal force and suction as hereinafter described. The transfer from chamber 41 to chamber 42 takes place in a helical rather than in a radial path because the particles passing into the first annular groove will ordinarily travel circumferentially through this groove before centrifugal force directs them outwardly into the next groove where the movement described will be repeated.

As mentioned above, a single annular groove 56 may be provided instead of plural grooves as shown at 55. Repeated experiments have taught me that the device as described becomes substantially inoperative in a short period of time if at least one annular groove is not provided adjacent the grinding wheel surface. This is due to the fact that the ground material soon cakes or is packed onto the surface of flange 39 at this point, thus prohibiting free movement of the ground particles from chamber 41 to chamber 42.

It is especially desirable to eliminate caking of the material at this point because it slows down the grinding wheel, reduces the effective grinding area, blocks the passage of ground product from chamber 41 to chamber 42, and causes undue heating of the grain. There are several theories which might be advanced to explain why packing does not occur when the surface is grooved, but regardless of which theory is considered the more logical, I present the described structure as the only method known to me whereby to successfully overcome this undesirable condition.

The ground product from within chamber 42 is drawn through a centrifugally disposed eye 45 in plate 57 by suction created by the turbine type fan 30. As best shown in Fig. 3, fan 30 carries turbine type blades 70 which are preferably arced as shown. Air is drawn into chamber 43 through a plurality of circumferentially spaced apertures 71 whereby to entrain the incoming ground product. The ground product is, therefore, drawn across and away from the peripheral grinding area of the grinding wheel 32 and, entrained with the air in chamber 43 is passed out through outlet 74 for passage to separator 13 illustrated in Figure 4.

It will be noted that both ground and unground grain is thrown outwardly by centrifugal force imparted thereto by the grinding wheel as well as by the agitator. Only the ground product escapes between the wheel 32 and the channeled flange 390 and into chamber 42. I have found that when centrifugal force alone is relied upon to effect delivery of the ground product between the chambers that the rate of such transfer is relatively slow and that a periodic choking up is apt to result. But in the disclosed apparatus, suction from fan 30 is employed as an aid to greatly speed up this transfer and to eliminate choking up. This suction also aids in the feeding of unground grain to the wheel. The fan produces an even "pull" or "draft" across the surface of the wheel adjacent the spider to drain out the ground product from the unground grain.

I claim:

1. In a grinding mill, the combination with an inlet chamber adapted to receive grain by gravity feed from an elevated source of supply, a second chamber partially separated from the inlet chamber by a partition having plural apertures, means for drawing grain through one aperture and returning excess portions through other apertures back to the inlet chamber, a grinding wheel at the side of the chamber opposite said partition, radially extending stationary arms in close proximity to the wheel to provide recesses intermediate the wheel in which grain may be abraded by said wheel, a ribbed wall in close parallel proximity to outer portions of said grinding wheel, and a centrifugal fan positioned with its intake surrounding said outer portions of the wheel to draw ground material past the ribbed wall and propel it to a point of delivery.

2. In a grinder, the combination with a receiving chamber, a grinding chamber partially separated from the receiving chamber by a partition having plural apertures, means for drawing grain through one of the apertures and returning excess portions to the other, a grinding wheel having a side surface vertically disposed at the side of the grinding chamber opposite the partition, stationary and radially extending arms spaced from the wheel to provide a channel between one surface thereof and the wheel surface wherein grain may be abraded, an annular ribbed grading wall opposing the grinding wheel adjacent its periphery and a centrifugal fan positioned and provided with an intake encompassing said wheel periphery to draw the graded material past the grinding wall and propel it to a point of delivery.

3. A device as set forth in claim 2 wherein the means for drawing grain comprises a cup-shaped agitator mounted within the grinding chamber concentric with the grinding wheel and adapted to rotate therewith, said agitator having serrated wall portions to distribute indrawn grain to all portions of the grinding chamber.

4. A device as set forth in claim 2 in which one of said plural apertures of the partition is centrally disposed, the remaining apertures being spaced therefrom in annularly disposed relation, and the means for drawing grain through the apertures comprises an agitator mounted within said grinding chamber and connected with the grinding wheel and in concentric relation to said centrally disposed aperture, said agitator comprising a cup-like portion opening toward said aperture and having serrated side walls, whereby during operation of the device the agitator acts as a pump into which grain from the receiving portion is drawn through the central aperture to be centrifugally passed through the serrated walls to be distributed throughout the grinding chamber.

5. In a mill having two chambers and a grinding wheel therebetween, a stationary set of spokes adjacent said wheel whereby to grind grain in one of the chambers and said wheel being positioned to provide a restricted passage between the chambers to prevent unground grain from passing therebetween, means within the passage for further grinding of the product as it passes therethrough, and suction means within the other chamber to aid in the operation of the device.

HARRY G. HARRIES.